(12) United States Patent
Hagg

(10) Patent No.: US 9,163,973 B2
(45) Date of Patent: Oct. 20, 2015

(54) IDENTIFYING UNDESIRED CONDITIONS IN THE FUNCTION OF A FLOATING ROOF OF A TANK

(71) Applicant: Rosemount Tank Radar AB, Gothenburg (SE)

(72) Inventor: Lennart Hagg, Kungsbacka (SE)

(73) Assignee: ROSEMOUNT TANK RADAR AB, Gothenburg (SE)

(*) Notice: Subject to any disclaimer, the term of this patent is extended or adjusted under 35 U.S.C. 154(b) by 479 days.

(21) Appl. No.: 13/724,697

(22) Filed: Dec. 21, 2012

(65) Prior Publication Data
US 2014/0174172 A1 Jun. 26, 2014

(51) Int. Cl.
G01F 23/284 (2006.01)
B65D 88/34 (2006.01)
G01S 13/08 (2006.01)
G01S 13/88 (2006.01)
B65D 88/40 (2006.01)
B65D 90/48 (2006.01)

(52) U.S. Cl.
CPC .............. *G01F 23/284* (2013.01); *B65D 88/34* (2013.01); *B65D 88/40* (2013.01); *B65D 90/48* (2013.01); *G01S 13/08* (2013.01); *G01S 13/88* (2013.01); *B65D 2590/0083* (2013.01)

(58) Field of Classification Search
CPC ....... G01F 23/284; B65D 88/34; B65D 88/40
See application file for complete search history.

(56) References Cited

U.S. PATENT DOCUMENTS

2008/0282794 A1* 11/2008 Jirskog ........................... 73/292
2013/0120155 A1 5/2013 Hagg

FOREIGN PATENT DOCUMENTS

| WO | 9426627 A1 | 11/1994 |
| WO | 9625647 A1 | 8/1996 |
| WO | 2008010702 A1 | 1/2008 |
| WO | 2013070131 A1 | 5/2013 |

OTHER PUBLICATIONS

International Search Report and Written Opinion dated Sep. 4, 2014, for corresponding International Application No. PCT/SE2013/000173, 11 pages.

* cited by examiner

*Primary Examiner* — Paul West
(74) *Attorney, Agent, or Firm* — Westman, Champlin & Koehler, P.A.

(57) ABSTRACT

A method for identifying an undesired condition in the function of a floating roof of a tank, the method comprising determining a filling level of a product in the tank, detecting a reference distance between a reference position on the roof and the surface using a level gauge mounted on the roof, forming a reference distance deviation as a difference between the reference distance and an expected value, and comparing the reference distance deviation with a specified range. If the reference distance deviation is outside the specified range, a data set including the reference distance deviation and the filling level is stored. These steps are repeated for a plurality of points in time, and the undesired condition is then identified based on stored data sets of reference distance deviations and filling levels. The present invention thus provides an economical method to provide diagnostics of a floating tank roof.

17 Claims, 3 Drawing Sheets

IDENTIFYING UNDESIRED CONDITIONS IN THE FUNCTION OF A FLOATING ROOF OF A TANK

FIELD OF THE INVENTION

The present invention relates to a method for identifying an undesired condition in the function of a floating roof of a tank.

BACKGROUND OF THE INVENTION

In external floating roof storage tanks, the floating roof is adapted to float on the product stored in the tank. It is known to provide monitoring systems for floating tank roofs.

The purpose with this type of system is to have control of the floating roof, i.e. to make sure that dangerous situations related to cases when the roof does not float properly on the product surface are detected. There are also advantages related to environmental requirements, e.g. to avoid evaporation of volatile hydrocarbons into the environment in case the roof gets flooded with product. Finally, the monitoring system may eliminate or at least reduce the need for inspection activities. Typically the pontoons of a floating roof must be inspected for leakage every year or even every quarter by a person that opens up the hatches in the pontoons. This type of work has certain personal risks and could be minimized with the roof tilt system.

The monitored distance between the floating roof and the product surface is normally substantially constant. Due to external influence such as wind, rain or snow, minor deviations of a few cm are acceptable, but deviations exceeding a certain threshold (e.g. more than 5 cm in some applications) typically indicate some kind of fault or undesired condition.

It would be desirable to provide diagnostics functionality for predicting when there are prevailing fault conditions, so that such fault conditions may be addressed before any incident occurs.

GENERAL DISCLOSURE OF THE INVENTION

It is an object of the present invention to provide such a diagnostics functionality. This and other objects are achieved by a method comprising:

a) determining a filling level of a product in the tank by emitting electromagnetic transmit signals into the tank and receiving electromagnetic echo signals reflected by a surface of the product, b) detecting a reference distance between a reference position on the roof and the surface using a level gauge mounted on the roof, c) forming a reference distance deviation as a difference between the reference distance and an expected value, d) comparing the reference distance deviation with a specified range, e) if the reference distance deviation is outside the specified range, storing a data set including the reference distance deviation and the filling level, f) repeating steps a) to e) for a plurality of points in time, g) based on stored data sets of reference distance deviations and filling levels, identifying the undesired condition.

The "undesired" condition may be a potential or an actual fault. By fault is intended not only as critical fault from a security or regulatory point of view, but also from a measurement accuracy and reliability point of view. A fault of the latter kind may not require an alarm, but by diagnosing such faults, or the potential that such faults occur, an improved performance of the level gauge installation may be obtained.

According to the present invention, a reference distance deviation is determined as the difference between a detected reference distance and an expected value. For each deviation outside a specified range, the detected reference distance and the filling level are stored, and a plurality of such value sets are analyzed and used to identify a fault condition.

The invention is based on the realization that it is sufficient to store such value sets, rather than large amounts of reference distance data and filling level data. The present invention thus provides an economical method to provide diagnostics of a floating tank roof.

By associating any recorded distance deviations with a detected filling level, information which identifies a fault condition may be obtained. Thereby, the function of the tank roof can be diagnosed and service measures or repairs may be initiated at an appropriate time.

The values in each data set are preferably acquired at substantially the same point in time. In practice, steps a) and b) are may be performed within a time period shorter than 0.1 s, or even shorter than 0.01 s.

The specified range is typically in the range ±2-20 cm, and may be, as an example, be in the range ±3-6 cm. Note also that the range is not necessarily symmetrical. It is possible that a greater deviation is acceptable above the expected value, or below the expected value. It is also possible that a first specified range is applied when the tank is filled and a second specified range is applied when the tank is emptied. The exact range value will depend on factors such as installation details and installation age.

Step b) is preferably performed in at least three locations on said roof. This makes it possible to determine if and to what extent the roof deviates from a horizontal position. Such an indication may in itself represent an undesired condition.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Embodiment of the present invention will now be described in relation to a monitoring system for a floating roof of the type disclosed in non-published U.S. application Ser. No. 13/294,364, herewith incorporated by reference.

Figure 1:
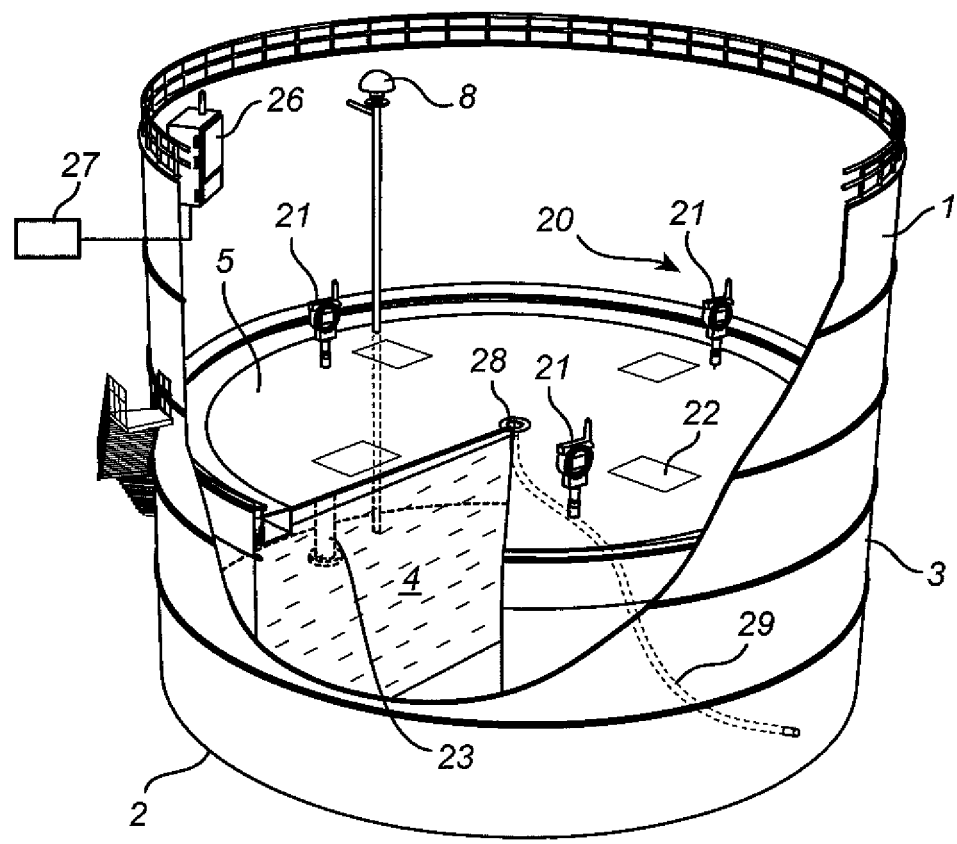
FIG. 1 is a perspective and schematic view of a tank with a floating roof and a roof monitoring system, suitable for implementing the present invention.
Figure 2:
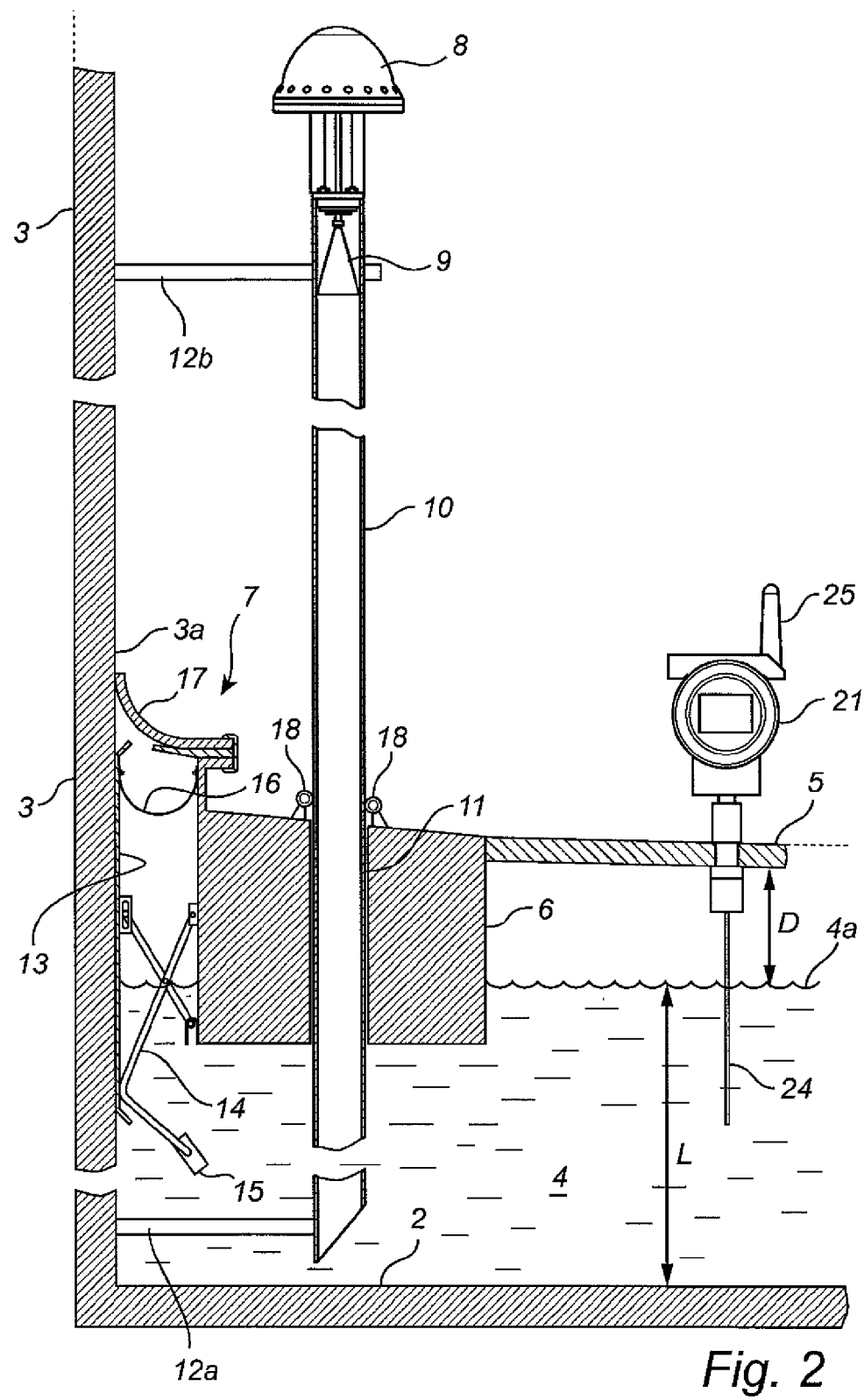
FIG. 2 is a side view of some details of FIG. 1.

FIGS. 1-2 shows a large floating roof tank 1 having a bottom 2 and a side wall 3. The tank 2 is made of steel and may have a diameter of several tens of meters. The tank contains a product 4, such as liquid oil or a petroleum product. A floating roof 5 floats on top of the product 4 by means of floats (pontoons) 6 integrated with the floating roof 5.

The tank 1 is further equipped with a level gauge 8 that can measure a filling level L of the product 4. The level gauge 8 may be of any suitable type, depending on the application. In the illustrated example, shown in more detail in FIG. 2, the level gauge 8 is a non-contact radar level gauge (RLG), i.e. a gauge having a directional antenna 9 for allowing free propagation of an electromagnetic transmit signal into the tank and receive an electromagnetic echo signal from the tank, and to determine a distance to the product surface 4a based on transmitted and reflected signals. The RLG 8 is here installed in the top of a still pipe 10, i.e. a vertical pipe extending along the inner tank wall through an opening 11 (see FIG. 2) in the floating roof 5.

The still pipe is installed according to normal installation practice, and will only briefly be described here, as an example. The still pipe 10 is arranged at a distance from the tank wall 3, and supported in its lower end by a supporting structure 12a, extending from the tank wall 3. The still pipe 10 ends at a distance from the tank bottom 2. The upper end of the still pipe 10 passes through a supporting plane 12b, which is mounted to the tank wall 3. The pipe 10 then supports the RLG 8. The pipe passes through the float 6 of the tank roof 5, and the opening 11 is then a sealed channel through the float 6. On the upper side of the float 6, close to the opening 11, are arranged rollers 18 ensuring that the tank roof 5 can move without too much friction up and down along the pipe 10. Additional rollers, and also various sealing arrangements, may be provided in or around the opening 11.

Further with reference to FIG. 2, the floating roof 5 has a sealing arrangement 7 extending continuously along its perimeter, immediately inside the tank wall 3, for limiting the passage of liquid and gas between the floating roof 5 and an inside 3a of the tank wall 3. The sealing arrangement comprises a so called shoe 13, held in contact with the wall 3 by means of a pentagraph hanger 14 connected between the float 6 and the shoe 13. The pressure between the shoe 13 and the tank wall 3 can be controlled by adjusting the weight 15 of the hanger 14. A primary seal 16, typically made of an oil resistant rubber, is provided between the roof 5 and the shoe 13. A secondary seal 17, typically a rubber lip, is provided between the roof 5 and the wall 3. Introduction of the secondary seal is often required by environmental regulations, but may giver rise to increased friction between the roof 5 and the tank 1.

As the skilled person will appreciate, the floating roof tank 1 and its associated equipment may further include pipe attachments, pipes, valves, actuators for filling and discharging the product, and various measuring and control devices etc.

Returning to FIG. 1, the tank 1 is equipped with a monitoring system 20 for monitoring the floating roof 5. The monitoring system has an on-roof subsystem including one or several, in the illustrated example three, radar level gauges 21 installed at spaced apart sensing locations of the floating roof 5. Preferable sensing locations for the gauges 21 will vary depending on a specific mechanical design of a floating roof 5 and tank 1. However, the gauges 21 are preferably located close to openings 22 which are already present in the floating roof 5. Such openings 22 may include access openings for roof support legs 23 or other openings, such as various inspection openings, generally with a cover fitted when the floating roof tank is in operation. Roof support legs 23 are generally used for supporting the floating roof 5 in a lowest position when the tank 1 is completely empty of its product 4 content.

As shown in more detail in FIG. 2, each level gauge 21 is adapted to measure a reference distance D to the product surface 4a relative to a vertical reference point of the floating roof in the respective sensing locations 14. In the illustrated embodiment of the invention, the level gauging units 21 are guided wave radar level gauges of a type using a single or dual conductor probe 24 to direct electromagnetic signals into the tank and receive an echo from impendence transitions caused by medium interfaces. The level gauging units 21 may alternatively be non-contact radar level gauges, having a directional antenna for allowing free propagation of electromagnetic signals into the tank, and receiving reflections from these signals. One important condition, however, is that the technology used for level gauging has a low power consumption, in order to render a long period of operation prior to requiring re-powering. The radar level gauge 21 of the type preferred in this system has an accuracy of about roughly between +/−5 cm and +/−1 mm. This should be approximately adequate for precisely determining any abnormal floating heights of the floating roof 5 and for keeping power consumption down.

In the illustrated embodiment, each radar level gauge 21 includes an intrinsically safe radio communication unit 25 for communicating externally a determined distance to the product surface in the specific sensing location. Each radar level gauge 21 also preferably has an internal power source, such as a battery possibly connected to a solar cell unit. In one version of a monitoring system 20, no wiring is required to the RLGs 21 making the system very flexible and versatile.

The monitoring system 20 further has an off-roof subsystem, i.e. a subsystem which is not arranged on the roof itself, which subsystem includes a radio communication unit 26 arranged to communicate wirelessly with the radar level gauges 21 and arranged to convey the detected distances D to a control system 27, typically located remotely of the tank 1, generally in a non-hazardous environment.

According to embodiments of the present invention, the level gauge 8 is also connected to the control system 27. This connection may be wireless, similar to the connection between the RLGs 21 and the control system 27, or it may be a wired connection. As the level gauge 8 is mounted in a fixed location on top of the tank 1, wireless connection may be less important. In many situations, there may be already existing wiring connecting the RLG 8 and the remote location where the control system 27 is located, such as a two-wire control loop.

Figure 3:
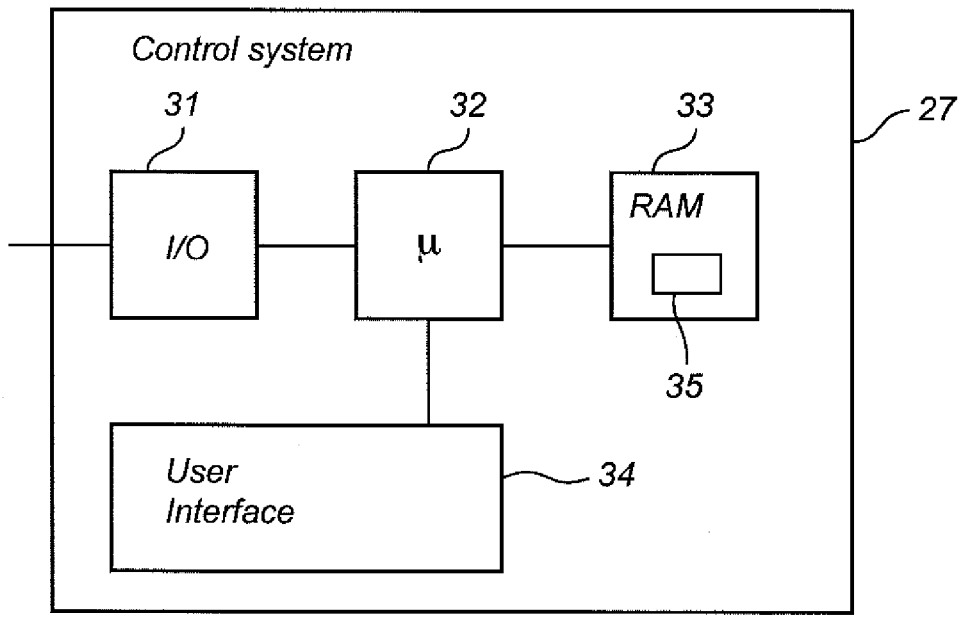
FIG. 3 is a block diagram of a control system in FIG. 1, according to an embodiment of the present invention.

FIG. 3 shows a schematic block diagram of the control system 27, which includes an input interface 31, processing circuitry such as a processor 32, a memory storage 33 and a user interface 34. The memory stores software code 35 to be executed by the processor 32 in order to perform a method according to an embodiment of the invention. It is noted that some functions may alternatively be realized in hardware or a combination of hardware and software.

Figure 4:
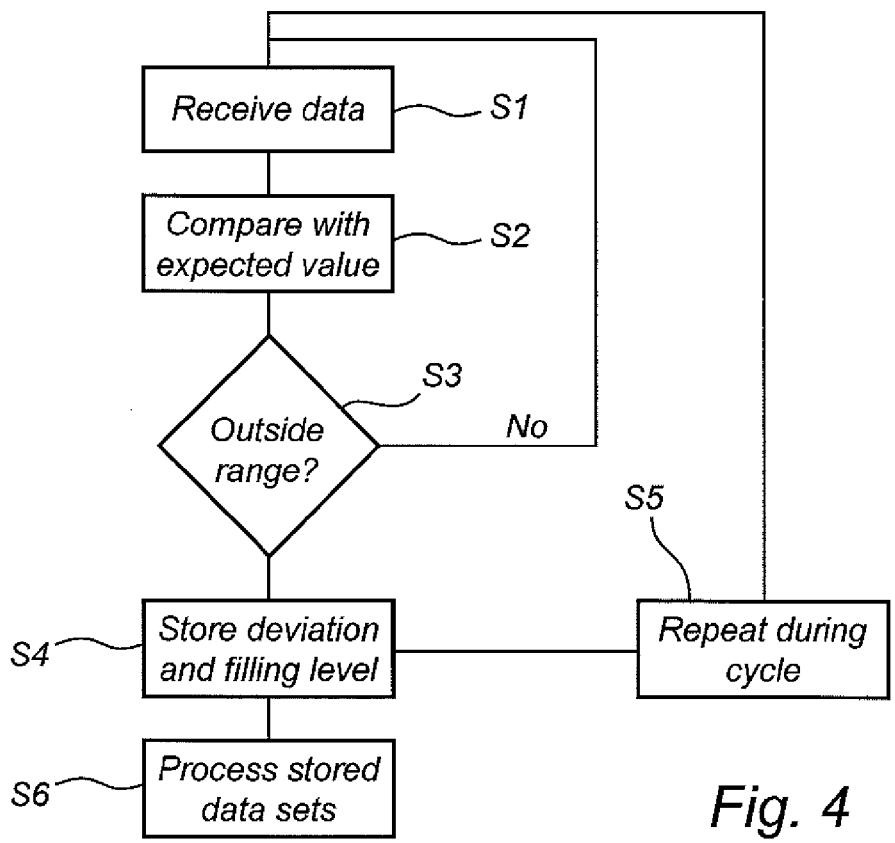
FIG. 4 is a flow chart of a method according to an embodiment of the invention.

The operation of the control system 27 will now be described with reference to FIG. 4, showing a flow chart of the various steps.

In step S1, the input 31 receives measurement data, including a filling level L from the RLG 8 and a reference distance $D_n$ from each of the RLGs 21. The measurement data has all been acquired at substantially the same time, i.e. within a short time period. This time period is preferably shorter than 0.1 s, and typically shorter than 0.01 s.

In step S2, each reference distance $D_n$ is compared to an expected value $D_{n,exp}$, which is accessed from memory 24, to form a reference distance deviation. In step S3, it is determined if the deviation lies outside an acceptable deviation range.

If the acceptable range is symmetrical around zero, i.e. the same amount of deviation is accepted below the expected distance as above the expected distance, then step S3 may be performed by comparing an absolute value of the deviation with a threshold value, i.e. determining if $|D_n - D_{n,\ exp}| > Th$. where $D_n$ is the reference distance deviation, $D_{n,\ exp}$ is the expected value, and Th is a specified threshold value.

If the acceptable range is asymmetric, e.g. if greater deviations are acceptable below the expected value than above it, then the deviation should be compared to both endpoints of the acceptable range, i.e. determining $Th_{below} < D_n - D_{n,exp} < Th_{above}$, where $D_n$ is the reference distance deviation, $D_{n,exp}$ is the expected value, and $Th_{below}$ and $Th_{above}$ are specified threshold values indicating an acceptable negative reference deviation (roof below expected position) and an acceptable positive distance deviation (roof above expected position), respectively.

It is further possible that the acceptable range is different depending on whether the tank is being filled or emptied. When the tank is being emptied, the reference distance is more likely to exceed the expected value, e.g. if the tank roof is briefly stuck during emptying, but the reference distance will be unlikely to fall below the expected value (except maybe for a very brief moment when the tank roof slips down to rest on the surface). Conversely, when the tank is being filled, the reference distance is more likely to fall below the expected value, e.g. if the tank roof is briefly stuck during filling, but the reference distance will be unlikely to exceed the expected value.

If the reference deviation of any of the RLGs 21 is determined to lie outside the acceptable range, this deviation is stored in memory 33, together with the filling level L recorded when this deviation was detected (step S4). Preferably, also the deviation values from other RLGs 21 may be stored. The data thus stored will be referred to as a deviation data set associated with a particular filling level.

Deviation data sets are stored during operation of the tank. In the embodiment in FIG. 4, the steps S1-S4 are repeated during an operation cycle, such as a filling and/or discharging of the tank. This is indicated by step S5. The software 35 executed by the processor 32 is adapted to use the stored data sets to perform various diagnostic functions (step S5), so as to be capable of identifying a plurality of different fault conditions. Some of these will be discussed in the following.

Roof-Tank Interface

During emptying and filling of the tank, deviations occurring during several consecutive emptying/filling cycles may indicate a problem in the interface between roof 5 and tank wall 3, e.g. the sealing arrangement 7.

If such recurring deviations occur at irregular product levels, this may indicate a too tight seal 7 between the roof and the tank wall. A possible remedy is then to adjust the weight 15 of the pentagraph hanger 14, to thereby adjust the pressure of the shoe 13 against the tank wall 3. The problem may also be caused by a recurring but temporary build-up of clingage (i.e. product that has solidified on the inner tank wall).

If such recurring deviations occur at the same product level, this indicates a mechanical asymmetry (e.g. a deformed tank) or permanent clingage at this level.

An indication about in what part of the roof the deviation occurs is possible due to the fact that the system has several (e.g. three) level gauges 21. Such an indication may provide further information about the problem.

Support Legs in Contact with Bottom

If deviations occur close to the bottom 2 of the tank, this indicates that the roof support legs 23 may be in contact with the tank bottom 2. It is not recommended to take level readings during these conditions, since tank roof correction of the level measurement is unreliable when the support legs are in contact with the bottom. The calculated volume will therefore be uncertain.

In a situation where the roof 5 is fully resting on the roof support legs 23, air will start to fill up the space under the roof 5 and this normally an unwanted (or forbidden) situation. In case of hydrocarbon products (petroleum etc), the air under the roof 5 will be saturated with gaseous hydrocarbons. When the tank is again filled with product this air volume will be pushed out above the roof, thereby causing an unnecessary pollution/hazardous situation.

This situation can be detected by a system according to an embodiment of the present invention, by introducing a predefined threshold $th_{air\,pocket}$ for the reference distance. If this threshold is exceeded, this indicates that an air pocket has formed between the roof 5 and the product surface 4a. In this situation, the system may provide an alarm.

It is noted that conventional filling level measurement can also be used to detect when the support legs 23 make contact with the bottom, but such alarms will depend on a correctly entered measure for the length of the support legs. This measure is normally entered from the design drawing of the tank (if available) and may often be inaccurate. Also if the level gauge stops working or is insufficiently calibrated, such alarm function may fail. By instead using the level gauges 21 for detection of the position of the roof 5, as suggested by this embodiment of the invention, it is possible to obtain a redundant detection of support leg contact with the bottom.

Rain Water

Rain water can typically cause a roof to sink if it is not drained off from the roof. For this purpose an open floating roof normally has a draining system including a rain water drain sump 28 installed at the center of the roof 5. From the sump 28 leads a flexible pipe 29 which transports the water out from the tank.

If the processing in step S6 indicates that the roof 5 is floating too deep, this may indicate that the draining system is not operating properly. An additional sensor (not shown) for measuring the water level in the drain sump 28, and connected to the same wireless unit 26, may be required to differentiate this case from other cases where the roof floats "too deep". If deviations indicating a low floating roof occur at the same time as an indication from the sump sensor that the rain water drain sump is full, this indicates a problem with the rain water drainage system. The tank roof monitoring system 20 would here primarily provide details about the situation.

The person skilled in the art realizes that the present invention by no means is limited to the preferred embodiments described above. On the contrary, many modifications and variations are possible within the scope of the appended claims. For example, the type of level gauges 8, 21 may be different, and also the number and location of the gauges 21 may be different. Further, the details of the control system 27 may be implemented in many different ways, in order to perform the steps of the method according to the invention.

What is claimed is:

1. A method for identifying an undesired condition in the function of a floating roof of a tank, said method comprising:
   a) determining a filling level of a product in said tank by emitting electromagnetic transmit signals into said tank and receiving electromagnetic echo signals reflected by a surface of said product,
   b) detecting a reference distance between a reference position on said roof and said surface using a level gauge mounted on said roof,
   c) forming a reference distance deviation as a difference between said reference distance and an expected value,
   d) comparing said reference distance deviation with a specified range,
   e) if said reference distance deviation is outside said specified range, storing a data set including said reference distance deviation and said filling level,
   f) repeating steps a) to e) for a plurality of points in time,
   g) based on stored data sets of reference distance deviations and filling levels, identifying said undesired condition.

2. The method according to claim 1, wherein said specified range is symmetric, so that step e) is performed by determining if $$|D_n - D_{n,\,exp}| > Th,$$

where $D_n$ is the reference distance deviation, $D_{n,\,exp}$ is the expected value, and Th is a specified threshold value.

3. The method according to claim 2, wherein said specified threshold value is in the range 2-20 cm.

4. The method according to claim 2, wherein said specified threshold value is in the range 3-6 cm.

5. The method according to claim 1, wherein said specified range is asymmetric, so that step e) is performed by determining if $$Th_{below} < D_n - D_{n,\,exp} < Th_{above},$$

where $D_n$ is the reference distance deviation, $D_{n,\,exp}$ is the expected value, and $Th_{below}$ and $Th_{above}$ are specified threshold values.

6. The method according to claim 1, wherein a first specified range is applied during filling of said tank and a second specified range is applied during emptying of said tank.

7. The method according to claim 1, wherein steps a) to e) are performed during a plurality of filling-emptying cycles, and wherein step g) comprises:
establishing that deviations are stored during consecutive filling-emptying cycles, and
identifying said undesired condition as a problem in an interface between a tank wall and said roof.

8. The method according to claim 7, wherein step g) further includes:
establishing that deviations are stored for varying filling levels, and
identifying said undesired condition as an excessive or uneven pressure on a sealing arrangement between said tank wall and said roof.

9. The method according to claim 7, wherein step g) further includes:
establishing that deviations are stored for a recurring filling level, and
identifying said undesired condition as one of a mechanical asymmetry and a permanent clingage at a position corresponding to said recurring filling level.

10. The method according to claim 1, wherein step g) further includes:
establishing that deviations are stored for filling levels in a bottom region of the tank, and
identifying said undesired condition as at least one support leg of said roof being in contact with a bottom surface of said tank.

11. The method according to claim 10, wherein step g) further includes:
establishing that said reference distance exceeds a predefined threshold value,
identifying said undesired condition as said roof resting on said support legs, such that an air pocket is formed beneath the roof.

12. The method of claim 1, wherein step b) is performed in at least three locations on said roof.

13. The method of claim 1, wherein steps a) and b) are performed within a time period shorter than 0,1 s.

14. The method of claim 13, wherein steps a) and b) are performed within a time period shorter than 0,01 s.

15. A control system for identifying an undesired condition in the function of a floating roof of a tank, said system comprising:
an interface for receiving a filling level of a product in said tank, and a reference distance between a reference position on said roof and a surface of said product,
processing circuitry for forming a reference distance deviation as a difference between said reference distance and an expected value, and comparing said reference distance deviation with a specified range,
a memory for storing a data set comprising said reference distance deviation and said filling level if said reference distance deviation is found to be outside said specified range,
said processing circuitry further being adapted to analyze a plurality of stored data sets of reference distance deviations and filling levels, in order to identify said undesired condition.

16. A monitoring system for monitoring a floating roof of a floating roof tank containing a liquid product, said system comprising:
a level gauge arranged to determine a filling level of a product in said tank by emitting electromagnetic transmit signals into said tank and receiving electromagnetic echo signals reflected by a surface of said product,
at least one level gauge mounted on said floating roof, and arranged to detect a reference distance between a reference position on said roof and said surface, and
a control system according to claim 15.

17. A computer program product comprising computer program code to perform, when executed on a computer, the steps of:
receiving a filling level of a product in a tank with a floating roof,
receiving a reference distance between a reference position on said roof and a surface of said product,
forming a reference distance deviation as a difference between said reference distance and an expected value,
comparing said reference distance deviation with a specified range,
storing a data set comprising said reference distance deviation and said filling level if said reference distance deviation is found to be outside said specified range, and
analyzing a plurality of stored data sets of reference distance deviations and filling levels, in order to identify an undesired condition.

* * * * *